(12) United States Patent
Fang (10) Patent No.: US 7,894,484 B2
(45) Date of Patent: Feb. 22, 2011

(54) METHOD FOR COMMON TRANSMISSION OVER MULTIPLE LINE PAIRS, AND TRANSMITTING END AND RECEIVING END THEREFOR

(75) Inventor: Liming Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 12/351,598

(22) Filed: Jan. 9, 2009

(65) Prior Publication Data

US 2009/0116376 A1 May 7, 2009

Related U.S. Application Data

(63) Continuation of application No. PCT/CN2007/070230, filed on Jul. 4, 2007.

(30) Foreign Application Priority Data

Jul. 10, 2006 (CN) .................. 2006 1 0061579

(51) Int. Cl.
  *H04J 1/00* (2006.01)
(52) U.S. Cl. ............... 370/485; 370/464; 370/480; 379/416; 379/417
(58) Field of Classification Search ............. 370/203, 370/210, 276, 282, 286, 464, 480, 485; 379/90.01, 379/93.01, 93.09, 406.01, 406.02, 406.05, 379/406.06, 406.12, 399.01, 402, 414, 416, 379/417
See application file for complete search history.

(56) References Cited

U.S. PATENT DOCUMENTS

| | | | |
|---|---|---|---|
| 6,317,495 B1* | 11/2001 | Gaikwad et al. | 379/417 |
| 6,507,608 B1 | 1/2003 | Norrell | |
| 2003/0016770 A1* | 1/2003 | Trans et al. | 375/346 |
| 2006/0034164 A1* | 2/2006 | Ozluturk | 370/208 |

FOREIGN PATENT DOCUMENTS

| | | | |
|---|---|---|---|
| CN | 1679269 A | 10/2005 | |
| CN | 1757213 A | 4/2006 | |
| CN | 1805316 A | 7/2006 | |
| EP | 1 179 902 A1 | 2/2002 | |

(Continued)

OTHER PUBLICATIONS

International Search Report issued in corresponding PCT Application No. PCT/CN2007/070230; mailed Oct. 18, 2007.

(Continued)

*Primary Examiner*—Chi H Pham
*Assistant Examiner*—Weibin Huang
(74) *Attorney, Agent, or Firm*—Brinks Hofer Gilson & Lione (57) ABSTRACT

The present disclosure discloses a method for common transmission over multiple line pairs, and a transmitting device and a receiving device therefor. The method for common transmission over multiple line pairs includes: modulating information to be sent; and sending a modulated signal to a receiving device over the multiple line pairs; wherein, a transmission spectrum of each transmitter in the multiple line pairs comprises two parts: a first part is a frequency segment that meets a bearer condition of a modulation method, and a second part is a frequency segment that does not meet the bearer condition of the modulation method.

15 Claims, 8 Drawing Sheets

FOREIGN PATENT DOCUMENTS

EP   1 187 361 A1   3/2002
WO   03/098850 A1   11/2003

OTHER PUBLICATIONS

Supplementary European Search Report issued in corresponding European Patent Application No. 07 76 4159; issued Oct. 16, 2009.

Zhang, Junfeng. "Orthogonal Frequency Division Multiplexing (OFDM) Modulation" China Academic Journal Electronic Publishing House. Dec. 16, 2009.

Office Action issued in corresponding Chinese Patent Application No. 2006100615798; issued Sep. 25, 2009.

* cited by examiner

METHOD FOR COMMON TRANSMISSION OVER MULTIPLE LINE PAIRS, AND TRANSMITTING END AND RECEIVING END THEREFOR

CROSS-REFERENCE TO RELATED APPLICATIONS

This application is a continuation application of PCT application No. PCT/CN2007/070230, filed Jul. 4, 2007, which claims the priority of CN Application No. 200610061579.8 filed on Jul. 10, 2006, titled "METHOD FOR COMMON TRANSMISSION OVER MULTIPLE LINE PAIRS, AND TRANSMITTING END AND RECEIVING END THEREFOR", the contents of both of which are incorporated herein by reference in their entireties.

FIELD

The present invention relates to the field of communication technologies, in particular, to a method for common transmission over multiple line pairs, and a transmitting end and a receiving end therefor.

BACKGROUND

Digital Subscriber Line (DSL) technology is a high speed transmission technology for transmitting data via telephone twisted pair, i.e., Unshielded Twisted Pair (UTP). DSL includes Asymmetrical Digital Subscriber Line (ADSL), Very-high-bit-rate Digital Subscriber Line (VDSL), ISDN Digital Subscriber Line (IDSL) and Single-pair High-bit-rate Digital Subscriber Line (SHDSL), etc.

Figure 1:
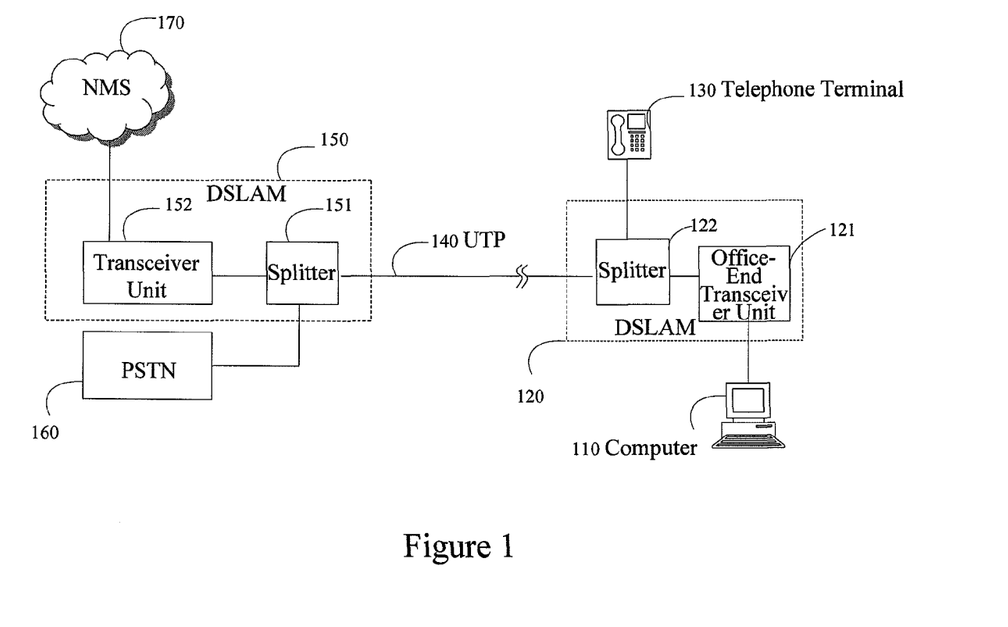
FIG. 1 is a schematic diagram showing a reference model of an XDSL system in the related art.

In various DSL technologies (xDSL), except for the DSL performing transmission on baseband such as IDSL, SHDSL, the DSL performing transmission on passband uses a frequency division multiplex technology, so that the DSL and the Plain Old Telephone Service (POTS) may coexist on the same twisted pair, where the DSL occupies the high frequency band, and the POTS occupies the baseband part below 4 KHz. The POTS signal and the DSL signal are split or combined via a splitter. The xDSL performing transmission on passband employs a Discrete Multi-Tone modulation (DMT) technology for modulation and demodulation. A system that provides multi-channel DSL access is referred to as a DSL Access Multiplexer (DSLAM). FIG. 1 is a schematic diagram showing a reference model of an xDSL system, where DSLAM 120 includes an office-end transceiver unit 121 and a splitter 122. In the uplink direction, the office-end transceiver unit 121 receives a DSL signal from a computer 110 and amplifies the received signal, and then sends the processed DSL signal to the splitter 122; the splitter 122 integrates the DSL signal from the office-end transceiver unit 121 and the POTS signal from a telephone terminal 130; the integrated signal is transmitted via a multi-channel UTP 140, and received by a splitter 151 in the remote DSLAM 150; the splitter 151 splits the received signal, sends the POTS signal in the received signal to the Public Switched Telephone Network (PSTN) 160, and sends the DSL signal in the received signal to a transceiver unit 152 of a DSLAM 150; the transceiver unit 152 amplifies the received signal and then sends the amplified signal to a Network Management System (NMS) 170. In the downlink direction of the signal, the signal is transmitted in a reverse order with respect to the above order.

Figure 2A:
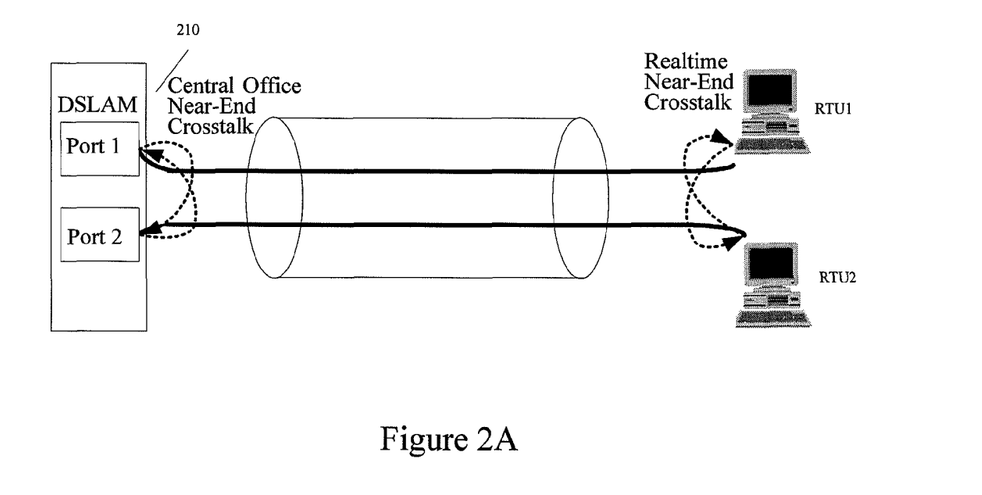
FIG. 2A and FIG. 2B are schematic diagrams of the near-end crosstalk and the remote-end crosstalk in the related art, respectively.
Figure 2B:
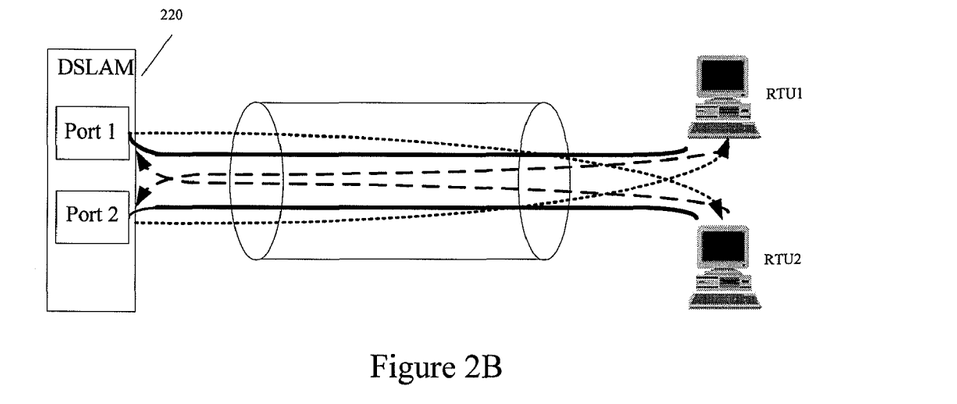

As the frequency band used in xDSL technology is raised, the problem of crosstalk, especially the high frequency band crosstalk, becomes more and more outstanding with each passing day. FIG. 2A and FIG. 2B are schematic diagrams of a near-end crosstalk and a remote-end crosstalk in xDSL, respectively. As shown in FIG. 2A, the near-end crosstalk (NEXT) refers to the crosstalk between the PORT 1 and the adjacent PORT2 in DSLAM 210 as well as the crosstalk between adjacent remote-terminal unit (RTU, in the embodiments of the invention, it mainly refers to the DSL modem) 1 and RTU2. As shown in FIG. 2B, the remote-end crosstalk (FEXT) refers to the crosstalk between the PORT1 in the DSLAM 220 and the remote RTU2 as well as the crosstalk between the PORT2 and the remote RTU1. Because the xDSL uplink and downlink channels employ the frequency division multiplex technology, the NEXT does not generate a severe harm to the performance of the system. However, the FEXT may seriously influence the transmission performance of the line. When users of a plurality of channels in a bundle of cables request to activate the xDSL service, the FEXT may cause the low rate and unstable performance of some lines, or it may even give rise to the problem that the xDSL service cannot be activated. As a result, a low line activation rate of DSLAM may be caused.

Figure 3:
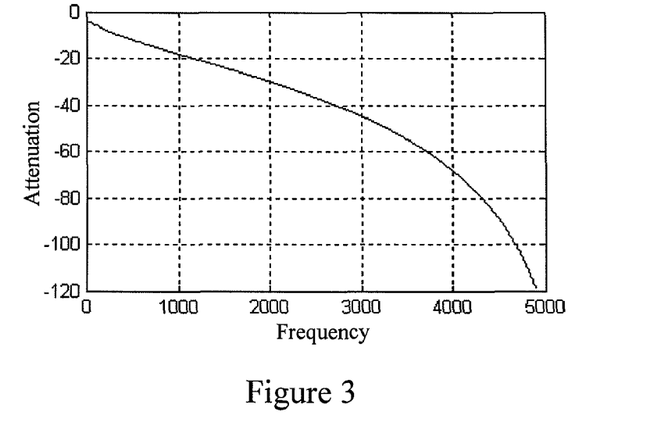
FIG. 3 is a schematic diagram of the attenuation characteristic of AWG26 at a wire length of 300 m in the related art.
Figure 4:
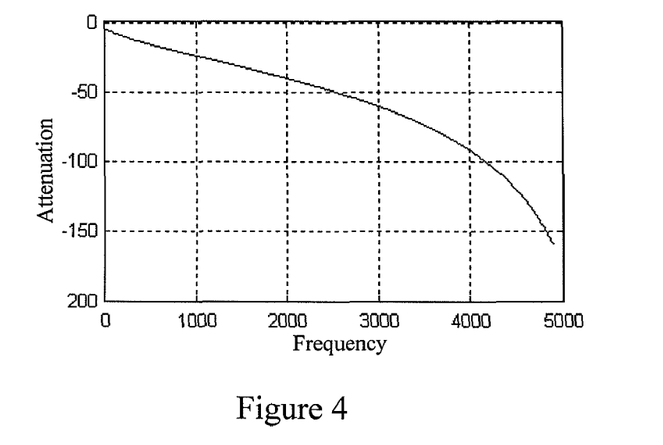
FIG. 4 is a schematic diagram of the attenuation characteristic of AWG26 at a wire length of 400 m in the related art.

The high frequency attenuation is another main factor that influences the transmission performance of the xDSL. FIG. 3 and FIG. 4 illustrate the attenuation characteristics of American Wire Gauge (AWG) 26 at a length of 300 m and 400 m, respectively. In FIG. 3 and FIG. 4, the longitudinal axis represents the signal amplitude, the horizontal axis represents the frequency, and each frequency interval represents 4.3125 kHz. For example, 4000 represents that the practical frequency is 4000*4.3125 kHz=17.25 Mhz. It can be seen from these two drawings that the higher the frequency is, the greater the attenuation of the signal is; and the longer the line is, the greater the attenuation of the signal is.

In view of the current xDSL technical standard, theoretically, the VDSL2 may provide a maximum uplink and downlink symmetrical rate of 100 Mbps. However, due to the influence of the above remote-end crosstalk and the signal high frequency attenuation, the transmission rate in practical disposition process is much lower than 100 Mbps. Even if a symmetrical 100 Mbps rate is provided, the transmission distance that can be achieved is only about 300 m. When a client demands a higher rate or a larger service radius, the VDSL2 technology would be helpless.

To meet the requirements of clients on higher rate or larger service radius, a technology for common transmission over multiple line pairs takes the stage. The technology for common transmission over multiple line pairs, in which multiple pairs of subscriber lines are used as physical transmission media simultaneously, may solve the problem that a single pair of DSLs cannot provide a higher speed.

The bonding technology is an earlier technology for common transmission over multiple line pairs. However, because the high frequency band is influenced by the remote-end crosstalk, the integrated performance of such technology is far from the linear superimpose of the performance of each line. The Multiple Input Multiple Output (MIMO) technology solves the problem that the bonding technology is influenced by the remote-end crosstalk.

Figure 5:
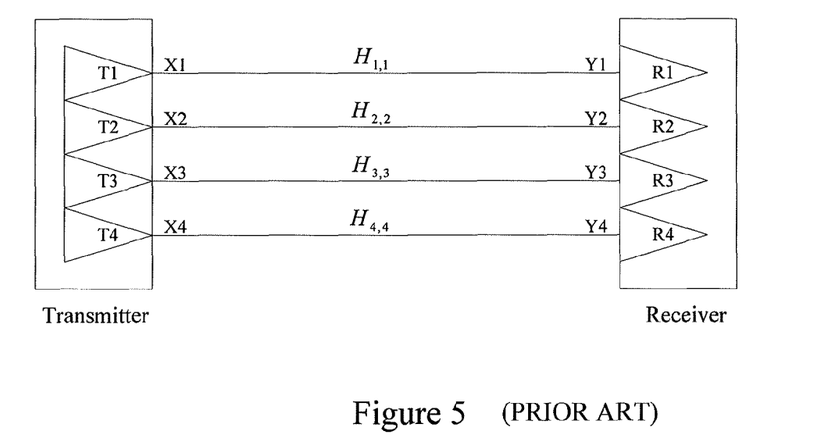
FIG. 5 is a functional diagram of the existing MIMO technology.

The operating principle of the MIMO technology is as follows:

FIG. 5 is a schematic diagram of the MIMO technology, where transmitters T1, T2, T3 and T4 are connected with receivers R1, R2, R3 and R4 respectively, in other words, four pairs of subscriber lines are used for transmitting data simultaneously. X1, X2, X3 and X4 are signals sent by the transmitters T1, T2, T3 and T4 respectively; Y1, Y2, Y3 and Y4 are signals received by the receivers R1, R2, R3 and R4 respectively; $H_{1,1}, H_{2,2}, H_{3,3} H_{4,4}$ are transmission functions of four transmission lines respectively.

$H_{n,n}$ represents the transmission function of line n, Xn represents the signal sent by transmitter n, Yn represents the signal received by receiver n. Because of the crosstalk, the signal Y1 received by the receiver R1 not only includes $H_{1,1}\cdot X1$, but also includes signal components generated on Y1 by signals sent by T2, T3 and T4 due to the remote-end crosstalk, as represented by the following formula:

$$Y = H \cdot X + N \qquad \text{Formula (1)}$$

where Y=[Y1,Y2,Y3,Y4], X=[X1,X2,X3,X4] and N=[N1, N2,N3,N4] are all 1*4 vectors, and $$H = \begin{bmatrix} H_{1,1} & H_{1,2} & H_{1,3} & H_{1,4} \\ H_{2,1} & H_{2,2} & H_{2,3} & H_{2,4} \\ H_{3,1} & H_{3,2} & H_{3,3} & H_{3,4} \\ H_{4,1} & H_{4,2} & H_{4,3} & H_{4,4} \end{bmatrix}$$

is a 4*4 matrix. $H_{n,m}$ represents the remote-end crosstalk function of Line m to Line n when m is not equal to n. Therefore, according to Formula (1), the signal received by the receiver R1 is $$Y1 = H_{1,1} \cdot X1 + N1 + \sum_{n=2}^{4} H_{1,n} \cdot Xn,$$

where the summation component on the right side of the above formula represents the sum of all the crosstalks. If the bonding technology is employed, the summation term may only be treated as a noise. However, it can be seen from this formula that there includes information of the signal sent. The MIMO technology just utilizes this feature and employs a signal joint processing mode to eliminate the crosstalk using this signal. In other words, both sides of Formula (1) are multiplied by $H^{-1}$ simultaneously: $H^{-1}Y=H^{-1}H\cdot X+H^{-1}N$. Therefore, the final received signal is $Y'=X+H^{-1}N$. It can be seen that the signal received is only related to the sent signal itself. In other words, the crosstalk is eliminated.

Practically, the MIMO technology further includes some other algorithms, and the influence of crosstalk is eliminated theoretically, thus the performance is higher than the bonding technology.

In view of the current DSL technology, the MIMO is the DSL technology with the optimal performance. However, in view of the modulation mode, the MIMO technology still uses the currently popular Orthogonal Frequency Divided Multiple (OFDM) mode. In other words, the transmission capacity estimation method of each pair of lines is still similar to the estimation method of VDSL2, and the advantages of joint processing of multiple line pairs are not given a full play.

In the MIMO technology, the communication capacity estimation of each pair of lines is as follows:

In the field of communications, there exists a well-known Shannon Theorem about line communication capacity estimation, the formula of which is referred to as Shannon channel capacity formula:

$$C = W \cdot \log_2\left(1 + \frac{S}{N}\right) \text{ (bit/second)} \qquad \text{Formula (2)}$$

where C represents the channel capacity; S represents the signal amplitude of the receiving end; N represents the noise amplitude; and W represents the signal bandwidth.

It can be seen from Shannon channel capacity formula that the wider the signal bandwidth is, the greater the channel capacity is; the greater the signal amplitude is, the greater the channel capacity is; and the smaller the noise is, the greater the channel capacity is.

In the MIMO technology, because factors such as spectrum compatibility and analog devices are considered, a maximum transmitted power spectrum density (PSD(f)) is usually defined on the transmitting end. Thus the maximum value of S in Shannon channel capacity Formula (2) is determined, and this maximum value is equal to the maximum transmitted power value subtracting the attenuation value. Therefore, the factors that determine MIMO communication capacity only include the noise and the signal bandwidth, where the noise mainly includes the white noise and the crosstalk, etc.

Figure 6:
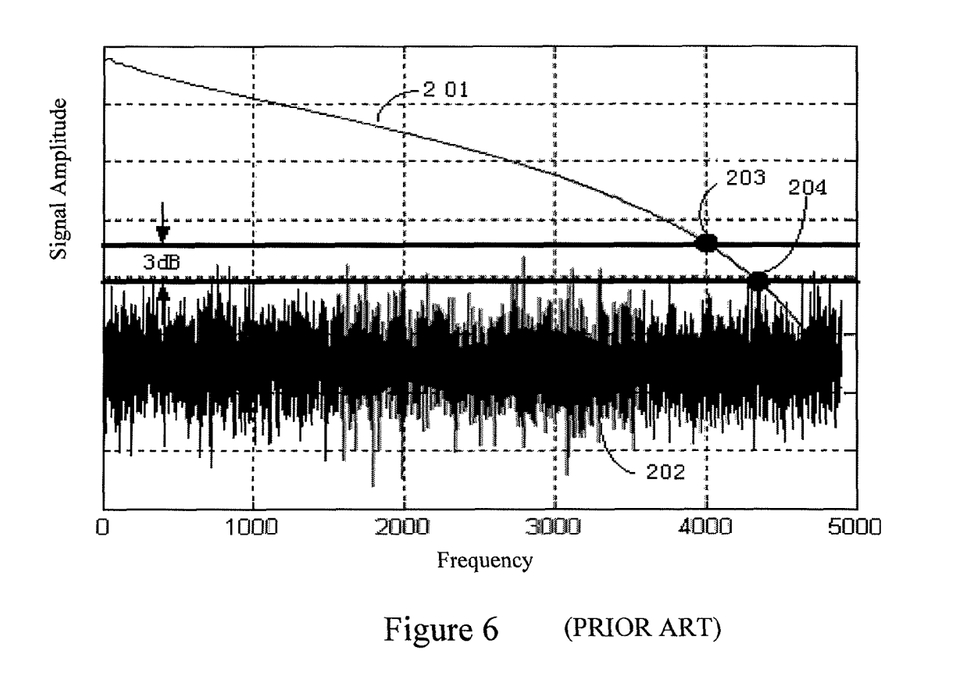
FIG. 6 is a schematic diagram of the amplitude frequency characteristic of a transmission signal and a white noise signal on the receiving end in the existing MIMO technology.

Because the crosstalk can be eliminated by the MIMO technology, only the white noise will be considered below. In FIG. 6, the longitudinal axis represents the signal amplitude, the horizontal axis represents the frequency, and each frequency interval represents 4.3125 kHz. The curve 201 represents the power spectrum density of a flat transmitted power spectrum density on the receiving end after line attenuation. The curve 202 represents the white noise of the receiving end. It can be seen from FIG. 6 that the point 204 where the signal-to-noise ratio (SNR) is greater than zero lies about the frequency 4400*4.3125 kHz. In the OFDM modulation technology, because data can only be carried when the SNR is greater than 3 dB, the frequency points that may be used for data transmission are frequencies below point 203, i.e., the frequency segments in the range of 0-4000*4.3125 kHz. For the frequencies between the point 203 and the point 204, although the SNR is greater than zero, they cannot be used for carrying data. This is a great waste. Therefore, in the MIMO technology, the advantages of joint processing of multiple line pairs are not given a full play.

Figure 7:
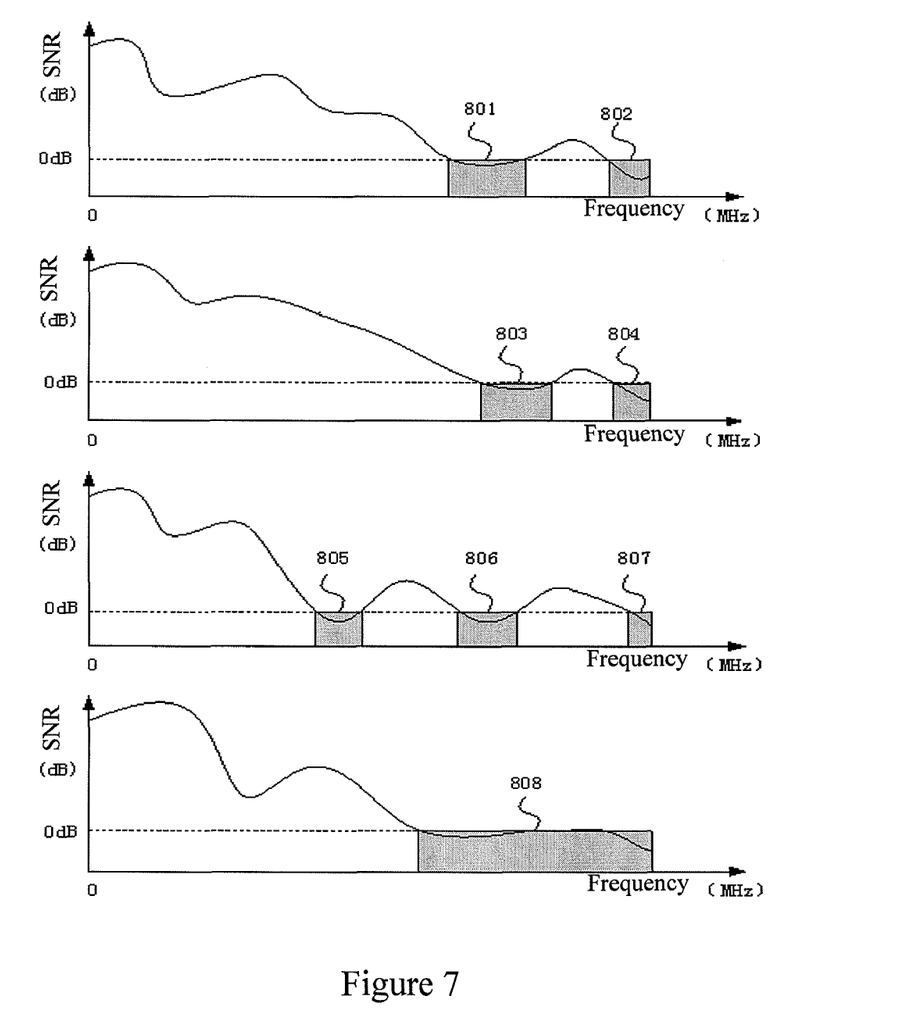
FIG. 7 is a schematic diagram of characteristics of the SNR with respect to frequency of four pairs of different lines in the related art.

Additionally, for different practical application environments, the noise of each pair of lines and the channel attenuation are different. As shown in FIG. 7, it shows a schematic diagram of the characteristics of the SNR with respect to frequency of four pairs of different lines. There are totally 8 frequency segments (from 801 to 808) that cannot carry one unit of bit. The SNRs corresponding to these frequency segments are all less than 0 dB, and they cannot meet the condition to carry data in the modulation technology. Therefore, these frequency segments are not utilized either, thus the channel resources are wasted.

SUMMARY

The embodiments of the invention provide a method for common transmission over multiple line pairs as well as a transmitting end and a receiving end, where the channel resources of multiple line pairs are fully utilized, and the joint transmission capacity of multiple line pairs is increased.

In an embodiment of the invention, there is provided a method for common transmission over multiple line pairs, which includes:

modulating information to be sent; and sending a modulated signal to a receiving end over the multiple line pairs; a transmission spectrum of each transmitter in the multiple line pairs comprises two parts: a first part is a frequency segment that meets a bearer condition of a modulation method, and a second part is a frequency segment that does not meet the bearer condition of the modulation method.

In another embodiment of the invention, there is provided a transmitting end, which includes:

a modulator group, adapted to modulate information to be sent;

a transmitter group, adapted to send out a modulated signal via multiple line pairs respectively; a transmission spectrum of each transmitter in the multiple line pairs comprises two parts: a first part is a frequency segment that meets a bearer condition, a second part is a frequency segment that does not meet the bearer condition.

In another embodiment of the invention, there is provided a receiving end, which includes:

a receiver group, adapted to receive modulated signals that are transmitted using frequency segments that meet a bearer condition and frequency segments that do not meet the bearer condition in a transmission spectrum of multiple line pairs respectively; and a demodulation module, adapted to demodulate the modulated signals and recover a signal that is sent.

In comparison with the prior art, the technical solutions according to the embodiments of the invention at least has the following advantages: in the embodiments of the invention, different signals are transmitted via low frequency bands of multiple pairs of transmission lines; additionally, the same signal is transmitted via high frequency bands of multiple pairs of transmission lines. In other words, the high frequency band channel resources that are not used by the current MIMO technology is fully utilized, thus the joint transmission capacity of multiple line pairs is increased, and the transmission rate of multiple pairs of transmission lines are increased at the same time.

BRIEF DESCRIPTION OF THE DRAWINGS

To make the embodiments of the invention or the technical solution of the prior art clearer, the drawings needed in the description of the embodiments or the prior art are now introduced briefly. Apparently, the drawings in the following description are only some embodiments of the present invention. For one of ordinary skill in the art, other drawings may be obtained according to these drawings, without any inventive efforts.

DETAILED DESCRIPTION OF THE EMBODIMENTS

The technical solutions according to the embodiments of the invention will now be described clearly and fully in conjunction with the drawings in the embodiments of the invention. Apparently, the embodiments described are only a part of the embodiments of the invention, rather than all the embodiments. Based on the embodiments of the invention, all the other embodiments obtained by one of ordinary skill in the art without any inventive efforts are in the protection scope of the present invention.

The embodiments of the invention will now be further illustrated by taking the OFDM modulation and demodulation technology as an example, in conjunction with the drawings.

In embodiments of the invention, the frequency segments that cannot be used in the prior art are utilized to carry data, thus the channel resources may be fully utilized, and the joint transmission capacity of multiple line pairs may be increased.

Embodiment 1

According to the value of the SNR of each line pair, the corresponding frequency segments of which the SNR is greater than or equal to 3 dB are regarded as frequency segments that meet the bearer condition, and the corresponding frequency segments of which the SNR is less than 3 dB are regarded as frequency segments that do not meet the bearer condition. The information to be sent is divided into N+M (M is greater than or is equal to 1) parts, where N parts of the information to be sent are carried on frequency segments of N line pairs that meet the bearer condition respectively; in other words, N parts of the information to be sent are sent via N line pairs respectively and the existing MIMO operating mode is employed. The remaining M parts of the information to be sent are carried repeatedly on at least two frequency segments that do not meet the bearer condition, in other words, any one of the M parts of the information to be sent may be transmitted via at least two frequency segments that do not meet the bearer condition on the same line pair (for example, the frequency segments 805, 806 and 807 in FIG. 7), or may be transmitted via at least two frequency segments that do not meet the bearer condition on different line pairs (for example, the frequency segments 801 and 803 in FIG. 7). When the information sent is received, the recovery process of the N parts of the information sent also employs the existing MIMO operating mode, i.e., the N parts of the information sent are restored independently; and for the recovery of the M parts of the information sent, the signals are first superimposed and then restored, i.e., the signals that include the same part of the information sent (specifically, it refers to the M parts of the information sent) are superimposed by an adder, and then the M parts of the information sent are restored one by one.

The specific process of this solution is as follows:

If there are four pairs of transmission lines, and according to the value of SNR, the information to be sent is divided into 5 parts, which are marked as: C(X1), C(X2), C(X3), C(X4) and C(Xh). The frequency segments that meet the bearer condition in line pair 1, line pair 2, line pair 3 and line pair 4 are used for carrying information C(X1), C(X2), C(X3) and C(X4). Information C(Xh) is carried repeatedly via at least two frequency segments that do not meet the bearer condition in line pair 1, line pair 2, line pair 3 and line pair 4. For example, at least any two of the 8 frequency segments shown in FIG. 7 are employed to carry information C(Xh) repeatedly.

The principle will now be described hereinafter, because the crosstalk signal is eliminated in the MIMO technology, the influence of the crosstalk is no longer considered below.

Figure 8:
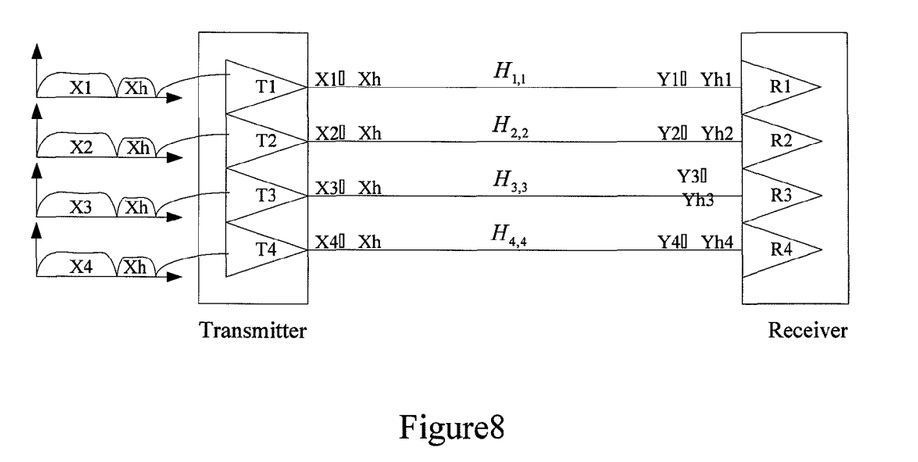
FIG. 8 is a functional diagram of multiple line pairs technology according to an embodiment of the invention.

In FIG. 8, X1, X2, X3 and X4 represent the modulated signals of information C(X1), C(X2), C(X3) and C(X4) respectively, and Xh represents the modulated signal of information C(Xh). Xh is superimposed with X1, X2, X3 and X4 respectively, and 4 sending signals X1+Xh, X2+Xh, X3+Xh and X4+Xh are formed, which are sent to the receiving end by four transmitters T1, T2, T3 and T4 respectively. $H_{1,1}, H_{2,2}, H_{3,3}, H_{4,4}$ are transmission functions of 4 lines respectively, and the signals received by four receivers R1, R2, R3 and R4 are Y1+Yh1, Y2+Yh2, Y3+Yh3 and Y4+Yh4 respectively. Yh1, Yh2, Yh3 and Yh4 may be split from the received signal respectively via a frequency division method, thus Yh1, Yh2, Yh3 and Yh4 may be respectively represented as Yh1=Xh·$H_{1,1}$+N1, Yh2=Xh·$H_{2,2}$+N2, Yh3=Xh·$H_{3,3}$+N3 and Yh4=Xh·$H_{4,4}$+N4, where N1, N2, N3 and N4 are white noises. These signals are added together at the receiving end to obtain the following:

$$Y'=Yh1+Yh2+Yh3+Yh4=Xh\cdot(H_{1,1}+H_{2,2}+H_{3,3}+H_{4,4})+(N1+N2+N3+N4).$$

Figure 9:
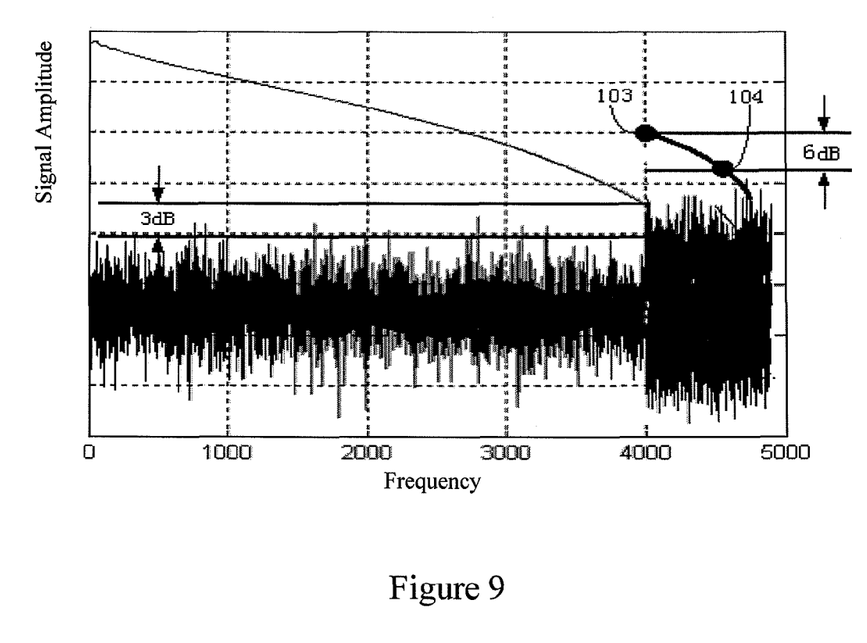
FIG. 9 is a schematic diagram of the amplitude frequency characteristic of a transmission signal and a white noise signal on the receiving end according to an embodiment of the invention.

The above formula is now qualitatively analyzed in view of signals. First of all, it is supposed that $H_{1,1} \approx H_{2,2} \approx H_{3,3} \approx H_{4,4}$, the power component of the signal in the above formula is increased to 16 times of the original power component. Because N1, N2, N3 and N4 are white noises and are independent with respect to each other, the power after they are added is increased to about 4 times of the original power. According to the computation formula of SNR:

$$\frac{S}{N} = 10 lg\left(\frac{s}{n}\right),$$

it may be deduced that the power SNR is increased by 6 dB. In FIG. 6, the point of which the power SNR is zero is point 204, and after the SNR is increased by 6 dB, the frequency segments between point 103 and point 104 are now able to carry information of 2 dB, as shown in FIG. 9. When there are many transmission lines for joint transmission, a part of the frequency points in FIG. 6 that are higher than point 204 may also has an SNR higher than 3 dB, so they may also be used for carrying some information. A part of the frequency points, of which the frequency is higher than the frequency corresponding to point 204 and the SNR is less than zero, may also be used for information transmission. In a similar way, the 8 frequency segments in FIG. 7 may also be used for carrying the information to be transmitted.

Thus, the frequency segments that cannot be used in the prior art may be utilized for carrying data, so that the joint transmission capacity of multiple line pairs may be raised.

Figure 10:
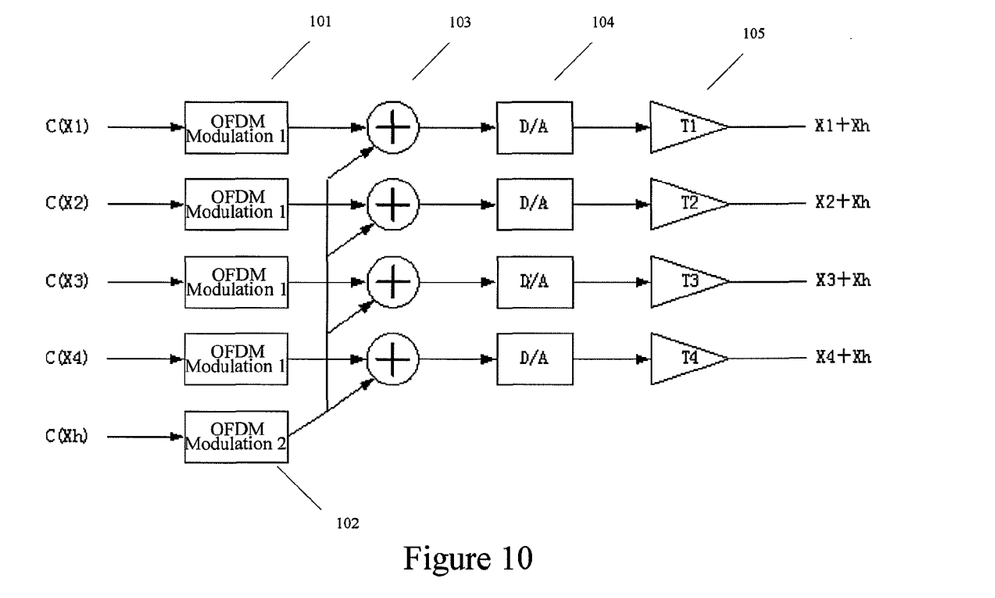
FIG. 10 is a schematic diagram of the transmitting end according to an embodiment of the invention.

FIG. 10 shows a schematic diagram of the transmitting end according to this embodiment. For a transmission system with four pairs of transmission lines, the transmitting end includes: a first modulator group 101 including four OFDM demodulators 1; a second modulator (i.e., OFDM modulator 2) 102; an adder group 103 including four adders; a D/A converter group 104 including four D/A converters; and a transmitter group 105 including four transmitters. The four OFDM demodulators 1 are adapted to modulate the signals on frequency segments that meet the bearer condition, and the output terminals are connected with four adders respectively. The OFDM modulator 2 is specially adapted to modulate signals on frequency segments that do not meet the bearer condition, and the output terminal is also connected with the four adders respectively. The input terminals of the four D/A converters are respectively connected with the output terminals of the four adders, and the output terminals are respectively connected with four transmitters. Moreover, all the D/A converter employ the same clock.

When the transmitting end is in operation, the data to be sent (the information to be sent) are divided into 5 parts according to a BIT table: C(X1), C(X2), C(X3), C(X4) and C(Xh). The first four bit groups C(X1), C(X2), C(X3) and C(X4) are respectively modulated on frequency segments that meet the bearer condition using the same OFDM modulator 1, and four modulated signals X1, X2, X3 and X4 are obtained. The bit group C(Xh) is modulated on frequency segments that do not meet the bearer condition using OFDM modulator 2, and a modulated signal Xh is obtained. The modulated signal Xh is respectively superimposed with the four modulated signals X1, X2, X3 and X4 by four adders. The four signals superimposed are converted by a D/A converter respectively, sent to different four pairs of transmission lines by drives T1, T2, T3 and T4 respectively, and then transmitted to the receiving end via four pairs of transmission lines.

Figure 11:
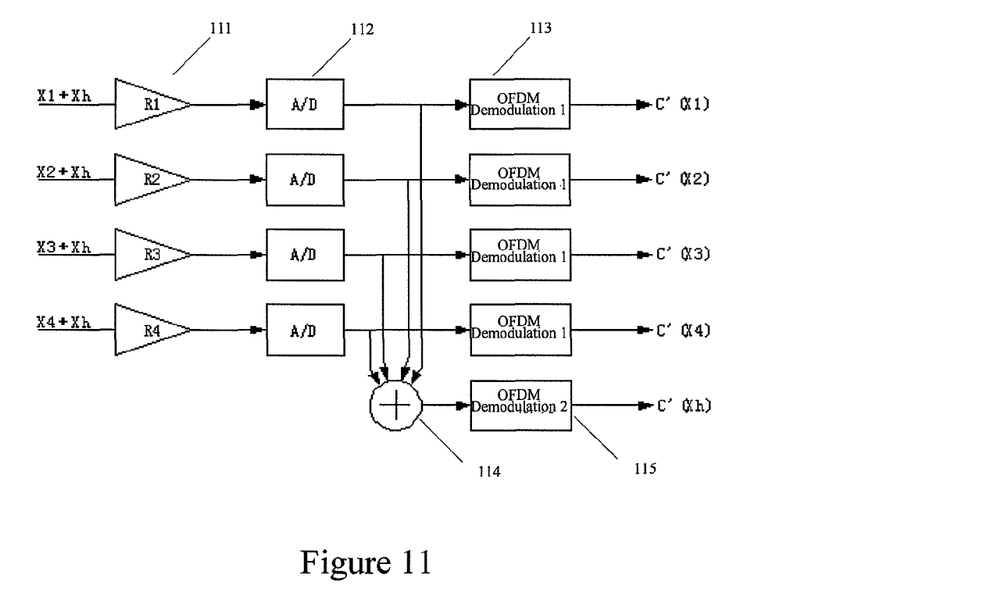
FIG. 11 is schematic diagram 1 of the receiving end according to an embodiment of the invention.

FIG. 11 shows the schematic diagram (1) of the receiving end according to the embodiment. For a transmission system with four pairs of transmission lines, the receiving end includes: a receiver group 111 including four receivers R1, R2, R3 and R4; an A/D converter group 112 including four A/D converters using the same clock; a first demodulator group 113 including four OFDM demodulators 1; an adder 114; and a second demodulator (i.e., OFDM demodulator 2) 115. The output terminals of the four receivers are connected with the input terminals of the four A/D converters respectively. The first demodulator group 113 is adapted to demodulate and restore the information carried on the frequency segments that meet the bearer condition, and the input terminals are connected with the output terminals of the four AD converters respectively. The output terminals of the four A/D converters are also connected with the input terminal of the adder, and the output terminal of the adder is connected with the input terminal of the OFDM demodulator 2. The second demodulator 115 is adapted to demodulate and restore the information carried on the frequency segments that do not meet the bearer condition.

During operation, the receivers R1, R2, R3 and R4 respectively receive signals X1+Xh, X2+Xh, X3+Xh and X4+Xh from the lines, and an A/D Transform is performed by the four A/D converters respectively. The four signals after the A/D Transform are demodulated using the four OFDM demodulators 1 respectively. During the demodulation process, the information carried on the frequency segments that do not meet the bearer condition is discarded, and four parts of information C'(X1), C'(X2), C'(X3) and C'(X4) are obtained respectively. Meanwhile, the four signals after A/D Transform are superimposed by an adder as the fifth signal, and the fifth signal is demodulated using the second demodulator 115. During the demodulation process, the information carried on the frequency segments that meet the bearer condition is discarded, and information C'(Xh) is obtained.

Figure 12:
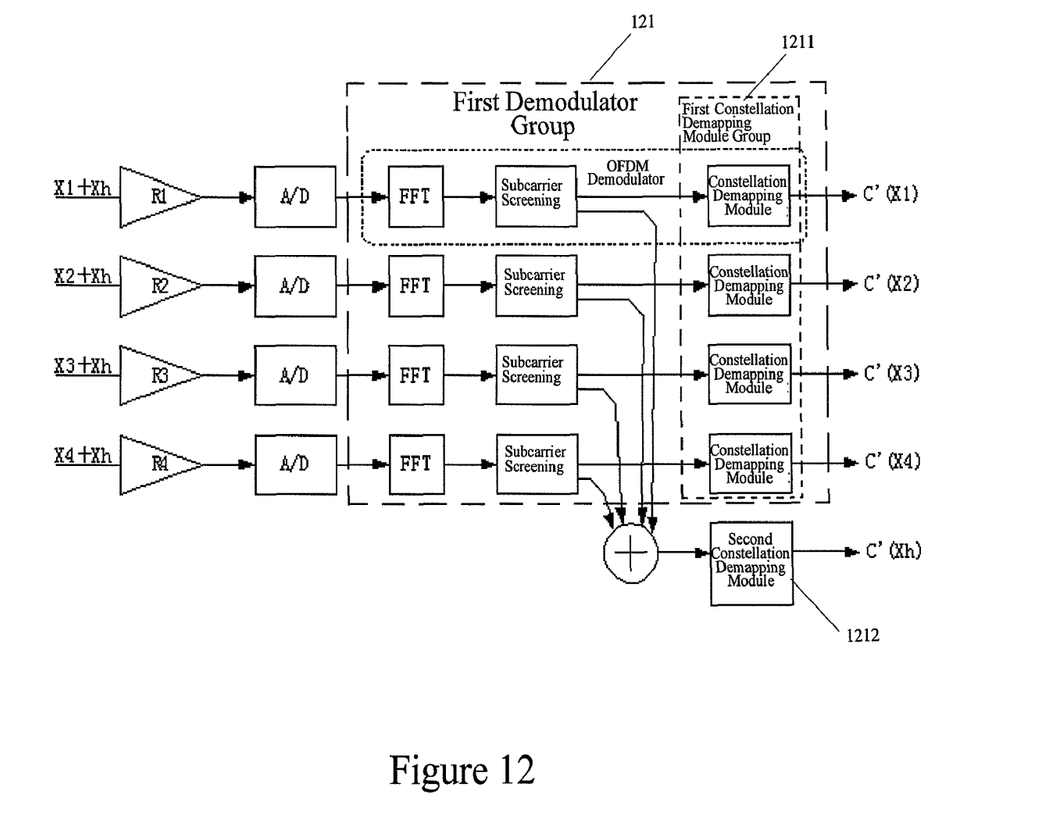
FIG. 12 is schematic diagram 2 of the receiving end according to an embodiment of the invention.

FIG. 12 shows the schematic diagram (2) of the receiving end according to this embodiment. The difference between the schematic diagram (2) and the above schematic diagram (1) lies in that the four signals are demodulated by four OFDM demodulators in the first demodulator group 121 respectively; and during the demodulation process, a Fast Fourier Transform (FFT) operation is first performed on the four signals, then a subcarrier screening is performed. Thus the carrier data that carry information Xh is separated from the carrier data that carry information X1, X2, X3 and X4 respectively, and four screened signals that carry the information Xh and four screened signals that carry the information X1, X2, X3 and X4 respectively are obtained. The four screened signals that carry the information X1, X2, X3 and X4 are processed by a first constellation demapping module group 1211 in a first demodulator group 121, and then the procedure directly turns to a series of subsequent demodulation processes such as constellation demapping and obtains the result C'(X1), C'(X2), C'(X3) and C'(X4). The four screened signals that carry the information Xh are superimposed by an adder, and a series of demodulation processes such as constellation demapping are performed on the superimposed signal by a second constellation demapping module 1212, and then the final result C'(Xh) is obtained.

Embodiment 2

Figure 13:
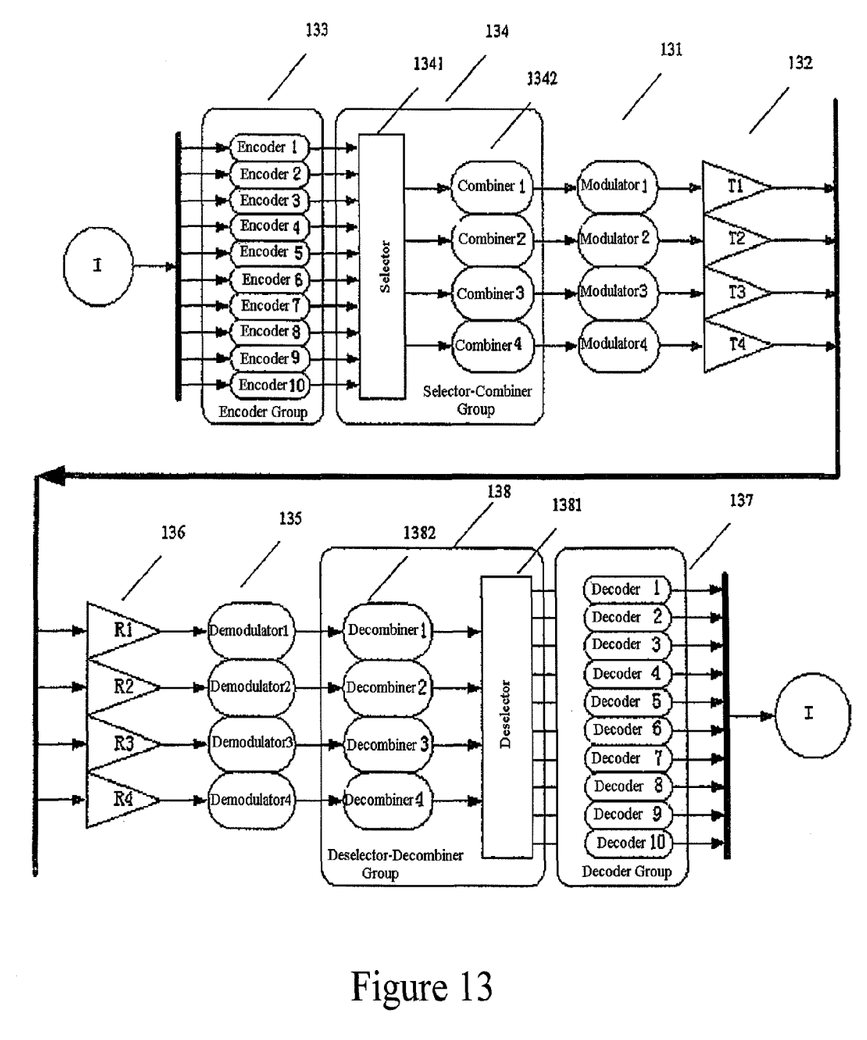
FIG. 13 is a schematic diagram of the transmitting end and the receiving end according to an embodiment of the invention.

FIG. 13 shows a schematic diagram of the transmitting end and the receiving end according to this embodiment.

The transmitting end includes: a modulator group 131 including four modulators; a transmitter group 132 including four transmitters; an encoder group 133 including ten encoders; and a selector-combiner group 134. The selector-combiner group 134 includes a selector 1341 and a combiner group 1342 including four combiners. Ten output terminals of the encoder group 133 are respectively connected with ten input terminals of selector 1341. Four output terminals of the selector 1341 are respectively connected with the input terminals of the four combiners. The output terminals of the four combiners are respectively connected with the input terminals of the four modulators; and the output terminals of the four modulators are respectively connected with the input terminals of the four transmitters.

First of all, the encoder group 133 encodes information I to be sent into 10 encoded signals. The selector 1341 performs selection from the 10 encoded signals and physically combines the encoded signals with different coding gains that can be carried by each line pair. The combiner group 1342 logically combines the encoded signals with different coding gains and obtains four data streams. According to the value of SNR of each line pair, the corresponding frequency segments of which the SNR is greater than or equal to 3 dB are taken as frequency segments that meet the bearer condition, and the corresponding frequency segments of which the SNR is less than 3 dB are taken as frequency segments that do not meet the bearer condition. The frequency segments that meet the bearer condition in the four line pairs are used for transmitting encoded signals with a low coding gain, and at least two frequency segments that do not meet the bearer condition in the four line pairs are used for transmitting encoded signals with a high coding gain, where the at least two frequency segments that do not meet the bearer condition may be at least two frequency segments that do not meet the bearer condition in the same line pair, or they may also be at least two frequency segments that do not meet the bearer condition in different line pairs. For example, for an encoded signal 1, an encoded signal 2 and an encoded signal 3, where the coding gain of the encoded signal 1 is greater than the coding gain of the encoded signal 2, and the coding gain of the encoded signal 1 is greater than the coding gain of the encoded signal 3, the selector 1341 selects the encoded signal 1 and the encoded signal 2 for physical combination, and selects the encoded signal 1 and the encoded signal 3 for physical combination. Then the selector 1341 sends the encoded signal 1 and the encoded signal 2 together to the combiner 1, and sends the encoded signal 1 and the encoded signal 3 together to the combiner 2. The combiner 1 logically combines the encoded signal 1 and the encoded signal 2 and obtains a first data stream. The combiner 2 logically combines the encoded signal 1 and the encoded signal 3 and obtains a second data stream. The modulator 1 modulates these two data streams and sends the corresponding modulated signals to the transmitter 1 and the transmitter 2. The transmitter 1 and the transmitter 2 send the two modulated signals to a first pair of transmission lines and a second pair of transmission lines respectively, where the frequency segments that meet the bearer condition on the first pair of transmission lines are used for transmitting the encoded signals with a low coding gain, i.e., the encoded signal 2, and the frequency segments that do not meet the bearer condition on the first pair of lines (for example, the frequency segment 801 or the two frequency segments 801 and 802 as a whole as shown in FIG. 7) are used for transmitting the encoded signals with a high coding gain, i.e., the encoded signal 1. The frequency segments that meet the bearer condition on the second pair of transmission lines are used for transmitting the encoded signals with a low coding gain, i.e., the encoded signal 3, and the frequency segments that do not meet the bearer condition on the second pair of lines (for example, the frequency segment 803 as shown in FIG. 7) are used for transmitting the encoded signals with a high coding gain, i.e., the encoded signal 1.

The above 10 encoded signals are encoded by employing at least two encoding modes with different coding gains, such as Reed-Solomon (RS) encoding, Low Density Parity Code (LDPC) encoding. Of course, the information to be sent may only be encoded for 5 times, as long as the number of encoding is larger than the pair number of the transmission lines. Additionally, the encoders may be encoders of the same type with different parameters, or may be encoders of different types.

The receiving end includes a demodulator group 135, a receiver group 136, a decoder group 137, and a deselector-decombiner group 138 including a decombiner group and a deselector, where the receiver group 136 receives modulated signals from the four pairs of transmission lines and sends the modulated signals to the demodulator group 135 for demodulation, and obtains the above four data streams. The decombiner group 135 decombines these four data streams and logically separates the encoded signals with different coding gains. The deselector 1381 physically disassembles the encoded signals with different coding gains into the original 10 encoded signals according to the decombination result. Taking the above encoded signal 1, encoded signal 2 and encoded signal 3 as an example, the first data stream includes the encoded signal 1 and the encoded signal 2, and the second data stream includes the encoded signal 1 and the encoded signal 3, the decombiner 1 logically separates the encoded signal 1 and the encoded signal 2 in the first data stream. Meanwhile, the decombiner 2 logically separates the encoded signal 1 and the encoded signal 3 in the second data stream. Subsequently, the deselector physically separates the encoded signal 1 and the encoded signal 2 that are logically separated, and meanwhile physically separates the encoded signal 1 and the encoded signal 3 that are logically separated. The two encoded signals 1 are both sent to the corresponding decoder 1 for decoding, and the original information sent is obtained; and the encoded signal 2 and the encoded signal 3 are also sent to the corresponding decoder 2 and the decoder 3 for decoding, and the original information I sent is obtained.

In this embodiment, the encoder, selector and combiner in the transmitting end correspond to the decoder, deselector and decombiner in the receiving end. The encoding mode, selection policy and combination scheme employed for the information to be sent are commonly known for the transmitting end and the receiving end before the line works normally. The encoding mode, selection policy and combination scheme may be obtained through perform analysis according to the specific situation of the line on the receiving end, such as the frequency distribution of SNR, or may be obtained by perform analysis according to the line situation on the transmitting end. No matter the encoding mode, selection policy and combination scheme are obtained through performing analysis on the transmitting end or on the receiving end, they must be notified to the opposite party by the generator before the line operates normally; otherwise, the line cannot operate normally.

Additionally, it should be noted that one of ordinary skill in the art may understand that part or all of the processes for implementing the method according to the above embodiments may be accomplished by instructing related hardware via a program, and the program may be stored in a computer-readable storage medium, such as ROM/RAM, magnetic disc and compact disc.

In conclusion, in solution 1, an extra gain is obtained by generating redundancy via repeated sending, whereas in solution 2, the gain is obtained by encoding or/and generating redundancy via repeated sending. The realization of solution 1 is simple, and can meet most of the situations. The realization of solution 2 is relatively complex, and can meet almost all the practical situations, where the gain generated by encoding is relatively large, and the transmission performance may be improved more apparently. In the embodiments of the invention, the low frequency band of multiple pairs of transmission lines is utilized for transmitting different signals; moreover, the high frequency band of multiple pairs of transmission lines is also utilized for transmitting the same signal. Therefore, the channel resources of the multiple line pairs are fully utilized, the joint transmission capacity of the multiple line pairs is increased, and the transmission rate of the multiple pairs of transmission lines is also increased at the same time. By using the method according to the embodiments of the invention, it may give a full play to the advantages of joint processing of multiple line pairs, and the performance is improved greatly in comparison with the performance of the existing MIMO technology. Under the same transmission rate, the signal transmission distance in the multiple line pairs technology may be increased by employing the solution of the invention.

The contents described above are only embodiments and is intended to limit the protection scope of the present invention thereto. Other embodiments that are obtained by one of ordinary skill in the art through modification, replacement or substitution based on the embodiments of the present invention without inventive efforts fall in the protection scope of the present invention.

The invention claimed is:

1. A method for common transmission over multiple line pairs, comprising:
    modulating information to be sent on a signal;
    transmitting the modulated signal to a receiving device over the multiple line pairs;
    wherein, a transmission spectrum of each transmitter in the multiple line pairs comprises a frequency segment that meets a bearer condition of the modulating, and a frequency segment that does not meet the bearer condition of the modulating; the number of the multiple line pairs is N, N is greater than or equal to 2; and
    dividing the information to be sent into N+M parts, wherein, the N parts of the information to be sent are carried on frequency segments of the N line pairs that meet the bearer condition, the M parts of the information to be sent are carried on at least two frequency segments that do not meet the bearer condition, wherein M is greater than or equal to 1.

2. The method for common transmission over multiple line pairs according to claim 1, wherein, any one of the M parts of the information to be sent is transmitted on at least two frequency segments that do not meet the bearer condition on the same line pair, or is transmitted on at least two frequency segments that do not meet the bearer condition on different line pairs.

3. The method for common transmission over multiple line pairs according to claim 2, further comprising: recovering, by the receiving end, the N parts of the information according to the signal received, superimposing the M parts of the information, and recovering the M parts of the information.

4. The method for common transmission over multiple line pairs according to claim 1, comprising: modulating the information to be sent using an Orthogonal Frequency Divided Multiple (OFDM) modulation.

5. The method for common transmission over multiple line pairs according to claim 1, wherein, the frequency segments that meet the bearer condition have Signal to Noise Ratios (SNRs) greater than or equal to 3 dB, and the frequency segments that do not meet the bearer condition have SNRs less than 3 dB.

6. A transmitting device, comprising:
    a modulator group, adapted to modulate information to be sent on a signal; and
    a transmitter group, adapted to transmit the modulated signal via multiple line pairs; wherein, a transmission spectrum of each transmitter in the multiple line pairs comprises a frequency segment that meets a bearer condition, and a frequency segment that does not meet the bearer condition; the number of the multiple line pairs is N, and N is greater than or equal to 2; and
    an adder group,
    wherein,
    the modulator group comprises a first modulator group connected with a first input terminal of the adder group, the first modulator group is adapted to modulate N parts of the information to be sent on frequency segments that meet the bearer condition respectively;
    the modulator group further comprises a second modulator group connected with a second input terminal of the adder group, the second modulator group is adapted to modulate M parts of the information to be sent on frequency segments that do not meet the bearer condition respectively, wherein M is greater than or equal to 1; and the adder group is adapted to superimpose and output modulated signals from the first input terminal and the second input terminal.

7. The transmitting device according to claim 6, wherein the adder group is adapted to superimpose the modulated signal of any one of the M parts of the information to be sent with the modulated signals of at least two of the N parts of the information to be sent; and the transmitter group is adapted to send the superimposed signal to the receiving device via at least any two of the N line pairs.

8. The transmitting device according to claim 6, wherein, the transmitting device further comprises:
   an encoder group, adapted to divide the information to be sent into N+M parts, and obtain N+M encoded signals by encoding in at least two encoding modes with different coding gains, wherein M is greater than or equal to 1; and
   a selector-combiner group, adapted to select the encoded signals with a high coding gain and the encoded signals with a low coding gain from the N+M encoded signals, and recombine the encoded signals selected into N data streams;
   wherein the modulator group is adapted to modulate the N data streams respectively, and the transmitter group is adapted to send out the modulated signals via the N line pairs, the encoded signals with the low coding gain are carried on the frequency segments that meet the bearer condition on the N line pairs, and the encoded signals with high coding gain are carried on at least two frequency segments that do not meet the bearer condition on the N line pairs.

9. The transmitting device according to claim 8, wherein, the selector-combiner group comprises:
   a selector, adapted to perform selection from the N+M encoded signals and combine the encoded signals with different coding gains; and
   a combiner group, adapted to combine the encoded signals with different coding gains and obtain the N data streams.

10. The transmitting device according to claim 6, wherein, the transmitting device further comprises a digital-to-analog (D/A) converter group, and the D/A converter group is adapted to perform a D/A conversion on the signal modulated by the modulator group.

11. A receiving device, comprising:
   a receiver group, adapted to receive modulated signals that are transmitted using frequency segments that meet a bearer condition and frequency segments that do not meet the bearer condition in a transmission spectrum of multiple line pairs;
   a demodulation module, adapted to demodulate the modulated signals, wherein, the demodulation module comprises a first demodulator group and a second demodulator; and an adder; the number of the multiple line pairs is N, N is greater than or equal to 2;
   wherein the first demodulator group is adapted to demodulate the modulated signals received and obtain N parts of information sent;
   the adder is adapted to superimpose the modulated signals having the same part of the information sent and obtain M superimposed signals, wherein M is greater than or equal to 1; and
   the second demodulator group is adapted to demodulate the superimposed signals and obtain M parts of the information sent.

12. The receiving device according to claim 11, the receiving device further comprising a decoder group and a deselector-decombiner group,
   wherein the receiver group is adapted to receive the modulated signals transmitted on N line pairs;
   wherein the demodulation module is adapted to demodulate the modulated signals and obtain N data streams;
   wherein the deselector-decombiner group is adapted to decombine and deselect the N data streams, and obtain N+M encoded signals;
   wherein the decoder group is adapted to decode the N+M encoded signals respectively and recover the information sent, wherein, N is greater than or equal to 2, and M is greater than or equal to 1.

13. The receiving device according to claim 12, the deselector-decombiner group comprises a decombiner group and a deselector;
   wherein the decombiner group is adapted to decombine the N data streams and separate the encoded signals with different coding gains; and
   the deselector is adapted to split the encoded signals with different coding gains into N+M encoded signals according to a decombination result.

14. The receiving device according to claim 11 further comprises an A/D converter group that is adapted to perform an A/D conversion on the modulated signals received by the receiver group.

15. A receiving end, comprising:
   a receiver group, adapted to receive modulated signals that are transmitted using frequency segments that meet a bearer condition and frequency segments that do not meet the bearer condition in a transmission spectrum of multiple line pairs;
   a demodulation module, adapted to demodulate the modulated signals, wherein, the demodulation module comprises a first demodulator group and a second constellation demapping module, the first demodulator group comprises a first constellation demapping module group; and
   an adder;
   wherein the first demodulator group is adapted to perform a Fast Fourier Transform operation and perform a subcarrier screening respectively on the modulated signals received, and obtain N screened signals that carry the N parts of the information sent and N screened signals that carry the M parts of the information sent;
   wherein the first constellation demapping module group is adapted to perform a constellation demapping respectively on the N screened signals that carry the N parts of the information sent and obtain the N parts of the information sent;
   wherein the adder is adapted to superimpose the screened signals with the same part of the information sent in the N screened signals that carry the M parts of the information to be sent, and obtain M superimposed signals;
   wherein the second constellation demapping module is adapted to perform a constellation demapping respectively on the M superimposed signals and obtain the M parts of the information sent, wherein M is greater than or equal to 1.

* * * * *